United States Patent [19]

Nelson

[11] 4,112,468
[45] Sep. 5, 1978

[54] FACSIMILE RECEIVER

[75] Inventor: Richard L. Nelson, New York, N.Y.

[73] Assignee: Exxon Research & Engineering Co., Linden, N.J.

[21] Appl. No.: 606,506

[22] Filed: Aug. 21, 1975

[51] Int. Cl.² .......................... H04B 1/02; H04B 1/22
[52] U.S. Cl. ..................................... 358/280; 358/295
[58] Field of Search ............... 178/66 R, 88, DIG. 7, 178/6, 6.6 R, DIG. 16; 358/294, 295, 280

[56] References Cited

U.S. PATENT DOCUMENTS

| | | | |
|---|---|---|---|
| 2,865,991 | 12/1958 | Risner | 178/DIG. 16 |
| 3,436,487 | 4/1969 | Blane | 179/2 DP |
| 3,458,652 | 7/1969 | McMann | 178/DIG. 16 |
| 3,515,803 | 6/1970 | Lorang | 178/6.6 R |
| 3,590,152 | 6/1971 | McDonald | 178/6.8 |
| 3,622,699 | 11/1971 | Richeson | 178/DIG. 16 |
| 3,739,288 | 6/1973 | Coccagna | 178/66 R |
| 3,872,239 | 3/1975 | Nelson | 178/6 |
| 3,911,207 | 10/1975 | Barwick | 178/DIG. 7 |
| 3,916,098 | 10/1975 | Vandling | 178/DIG. 7 |

Primary Examiner—Robert L. Griffin
Assistant Examiner—Michael A. Masinick
Attorney, Agent, or Firm—N. L. Norris

[57] ABSTRACT

FM signals within a predetermined bandwidth representing dark-light variations in a document are transmitted over a communications network to a facsimile receiver. Signals are demodulated by a single-shot multivibrator which is triggered at a frequency in response to the FM signals. An average DC voltage detector is connected to the output of the multivibrator to generate an average DC voltage representing the ratio of the astable state duration to the multivibrator cycle. A bandpass filter in the receiver input substantially attenuates signals outside the range of the FM signals thereby enhancing facsimile quality and precluding an erroneous receiver shutdown by a control circuit responsive to the frequency and presence of signals being transmitted. Contrast and brightness controls are included in the stylus drive circuit of the receiver.

6 Claims, 6 Drawing Figures

FACSIMILE RECEIVER

BACKGROUND OF THE INVENTION

This invention relates to facsimile systems comprising a transmitter, a receiver and a communications network therebetween. More particularly, this invention relates to a system wherein a document is scanned in a facsimile transmitter to generate electrical information-bearing signals representing the dark-light variations in the document being scanned. These information-bearing signals are then transmitted over the communications network to a facsimile receiver where the information-bearing signals are converted to marks or images on a copy medium so as to form a copy which is a reasonable facsimile of the original document.

In several commercially available facsimile systems, the information-bearing signals which are transmitted over the communications network are FM (frequency modulated) signals. In general, these signals lie in an FM bandwidth of 1500 to 2400 Hz. which represents the audio range which is transmittable over ordinary telephone lines. Where this frequency range is utilized, the 1500 Hz. signals usually represent a white level, the 2400 Hz. signals represent the black level and signals in the frequency range between 1500 and 2400 Hz. represent varying degrees of gray. Copending U.S. application Ser. No. 417,797, filed Nov. 21, 1973, now U.S. Pat. No. 3,911,207 discloses a specific technique for demodulating the FM signals using a single-shot multivibrator which generates trigger signals having a frequency proportional to the frequency of the FM signals received by the facsimile receiver. Such a demodulation technique is desirable in that it is low cost and reliable in the absence of noise. In the presence of noise or input frequency components outside the 1500–2400 Hz. band of interest, the trigger signals may trigger the single-shot multivibrator at a frequency proportional to the noise or undesired frequency components, as well as the information-bearing FM signals representing the dark-light variations in the document being transmitted. In addition to producing poor copy at the receiver, the presence of noise or input frequency components outside the band of interest can actually shut the receiver down where control circuitry responsive to a poor signal transmission is utilized.

This control circuitry, which is disclosed in the aforesaid copending application, is designed to shut the receiver down when the received signal frequencies fall below 1500 Hz. for a predetermined length of time thereby indicating either a loss of signal or insufficient components of frequencies in the desired band of interest from the transmitter. However, it is possible to erroneously activate this control circuitry by the output of the single-shot multivibrator since the single-shot multivibrator can erroneously be triggered by a distorted input signal with frequency components below 1500 Hz. and the signal at the output of the multivibrator appears the same as it would if the signals being received had a frequency less than 1500 Hz.

Copending application Ser. No. 333,616, filed Feb. 20, 1973, now U.S. Pat. No. 3,872,239 discloses a receiver for demodulating signals representing dark-light variations on a document. The receiver also includes a stylus drive circuit having a brightness control potentiometer connected in the base circuit of a pair of transistors. There is no suggestion as to how contrast control might be achieved alone or in combination with brightness control.

SUMMARY OF THE INVENTION

It is an object of this invention to provide an FM facsimile receiver which can provide a faithful facsimile of a document even in the presence of noise, or input signals which, due to distortion, contain frequencies outside of the information-bearing frequency range.

It is a further object of this invention to provide an FM facsimile receiver and a control circuit for shutting down the receiver in the absence of an FM document information-bearing signal where the control circuit is not falsely activated in response to noise or input signals which, due to distortion, contain frequencies outside of the information-bearing frequency range.

In accordance with these and other objects of the invention, a facsimile receiver is provided for producing a copy on a copy medium at a receiving location in response to FM signals transmitted over conventional voice communication telephone lines where the FM signals represent light-dark variations in a document at a remote transmitting location with a first frequency representing white on the document and a second frequency representing black on the document.

The receiver comprises trigger means responsive to the FM signals for generating trigger signals having a variable frequency proportional to the frequency of the FM signal where a first frequency represents white on the document and a second frequency represents black on the document. A single-shot multivibrator coupled to the output of the trigger means is characterized by a quasistable or astable state of fixed duration initiated in response to one of the trigger signals where the ratio of the quasistable state duration to the period of the multivibrator cycle is directly proportional to the frequency of the FM signals. Detector means are coupled to the output of the single-shot multivibrator for detecting the ratio of the quasistable state duration to the period of the multivibrator cycle and generating a control signal representing the ratio. Writing means coupled to the output of the detector means mark on a copy medium in response to the control signal to reproduce light-dark variations in the document while scanning means move the writing means relative to the copy medium.

In accordance with one important aspect of the invention, filter means pass FM signals in a range between the first frequency and the second frequency while substantially attenuating noise signals and frequencies outside the range so as to substantially preclude the generation of trigger signals in response to the noise or frequencies outside the band of interest.

In a preferred embodiment of the invention, the first frequency representing white is substantially 1500 Hz. and the second frequency representing black is substantially 2400 Hz. The filter means comprises a bandpass filter for substantially attenuating frequencies above 2400 Hz. and below 1500 Hz. and may be located in the input amplifier stages of the receiver.

It is a further object of this invention to provide the adjustment of the contrast between light-dark variations reproduced on the copy medium at the receiver.

In accordance with this object of the invention, the writing means of the receiver comprises a stylus and a stylus drive circuit connected to the stylus for controlling writing by the stylus in response to a control signal generated by the detector means.

In a preferred embodiment of the invention, the stylus drive circuit comprises one transistor having a base, an emitter and a collector with the base connected to the output of the detector and the collector-emitter circuit connected to the stylus with a contrast control potentiometer connected in the collector-emitter circuit.

In accordance with another object of the invention, the facsimile receiver is also provided with a brightness control in combination with the above-described contrast control.

In the preferred embodiment of the invention, the stylus drive circuit comprises another transistor having a base, an emitter and a collector with the collector-emitter circuit of the other transistor connected to the base of the one transistor and the base of the second transistor connected to the output of the detector. The brightness control means comprises a potentiometer connected in the base circuit of the other transistor.

DETAILED DESCRIPTION OF A PREFERRED EMBODIMENT

Figure 1:
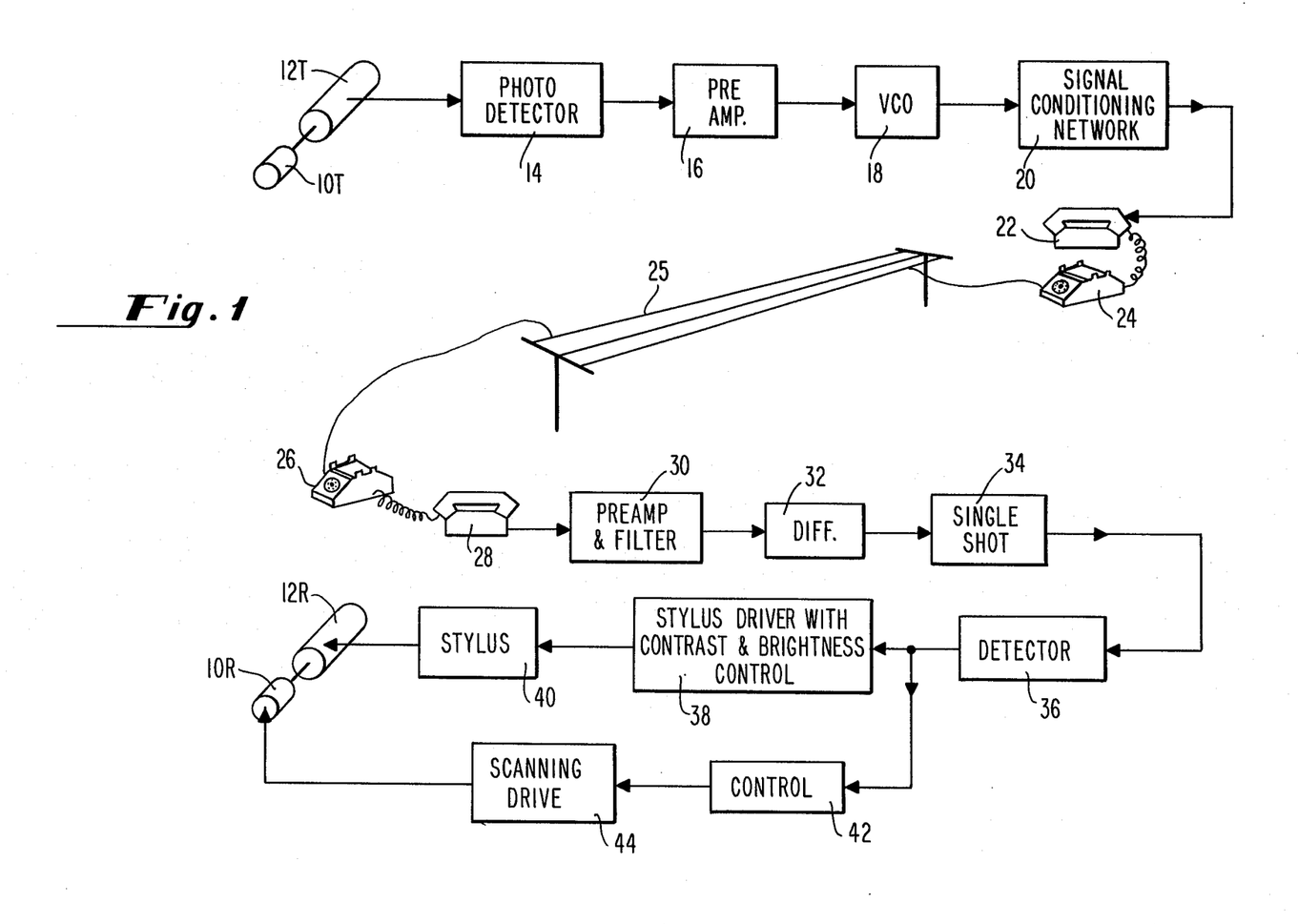
FIG. 1 is a block diagram of a facsimile system utilizing a facsimile receiver embodying the invention.

Referring now to the facsimile system shown in FIG. 1, a facsimile transmitter comprises a drum 12T rotated by a motor 10T so as to create a relative scanning movement between a document carried by the drum 12T and a scanning head not shown. As the scanning head is advanced axially along the drum 12T and the drum rotates about its axis, successive paths on the document are illuminated and variations in light intensity due to the reflectivity of the document are scanned by a photodetector 14. The photodetector 14 then converts these variations in light intensity which are a function of the reflectivity of the scanned document into electrical signals. These electrical signals are amplified at a preamplifier 16 and utilized to control a VCO (voltage controlled oscillator) 18 to generate frequency modulated signals representing the information content of the document carried by the drum 12T. The frequency modulated signals may then be amplified by a signal conditioning network or driver 20 before being applied to an acoustical coupler 22 which is associated with a conventional telephone handset 24.

The frequency modulated carrier is transmitted by suitable means such as conventional telephone lines 25 to a facsimile receiver which is coupled to another conventional telephone handset 26 and associated acoustical coupler 28.

In accordance with one important aspect of the invention, the output from the acoustical coupler 28 is applied to a preamplifier 30 including a bandpass filter for passing FM signals above a first frequency representing white on the document and below a second frequency representing black on the document while substantially attenuating noise signals or frequencies lying outside the range between the first frequency and the second frequency. The output from the preamplifier and filter 30 which is in the form of a square wave is then applied to a differentiating circuit 32 to generate trigger signals which are applied to an FM demodulator comprising a single-shot multivibrator 34 and a detector circuit 36 for determining the average DC value of the single-shot output. Since the bandpass filter of the preamplifier 30 removes undesirable noise signals or frequencies, trigger signals which are applied to the FM demodulator, i.e., the single-shot multivibrator 34, have a frequency corresponding to the frequency modulated signals representing the light-dark variations in the document at the remote transmitting location and not noise.

The control signal generated at the output of the detector 36 is then applied to a driver 38 for a stylus 40 associated with a movable head juxtaposed to a copy medium carried by a drum 12R. The scanning movement between the copy medium and the head is achieved by rotating the drum 12R by means of a motor 10R.

In accordance with another very important aspect of the invention, the stylus drive circuit 38 includes contrast and brightness control means. The contrast control permits adjustment of the contrast between light-dark variations on the copy medium in response to FM signals corresponding to those variations. The brightness control permits adjustment of the light gray print level with respect to a particular frequency within the FM band.

The facsimile receiver also includes a scanning control circuit 42 which utilizes the output from the detector circuit 36 to initiate scanning of the copy medium by applying a signal to a scanning drive 44 in response to an FM signal from the transmitter. The output of the scanning drive 44 is applied to the motor 10R. In addition, the scanning control circuit 42 provides means for shutting the receiver down in the absence of an information-bearing signal received at the handset 26.

In the prior art facsimile receiver disclosed in copending application Ser. No. 417,797 filed Nov. 21, 1973, the control circuit 42 would, on certain occasions, erroneously shut the facsimile receiver down in the presence of certain types of noise or frequency components present in a distorted input signal which lay outside the frequency band of interest, which made the output from the detector 36 appear similar to the output of the detector 36 when no FM information-bearing signal was present. However, by utilizing the filter in the preamplifier 30, this particular type of noise and undesirable frequency components have been eliminated so as to prevent false shutdown of the receiver by the control circuit 42. In addition, the filter at the preamplifier 30 has improved the quality of the facsimile by eliminating the aforesaid noise and undesirable frequency components.

Figure 2:
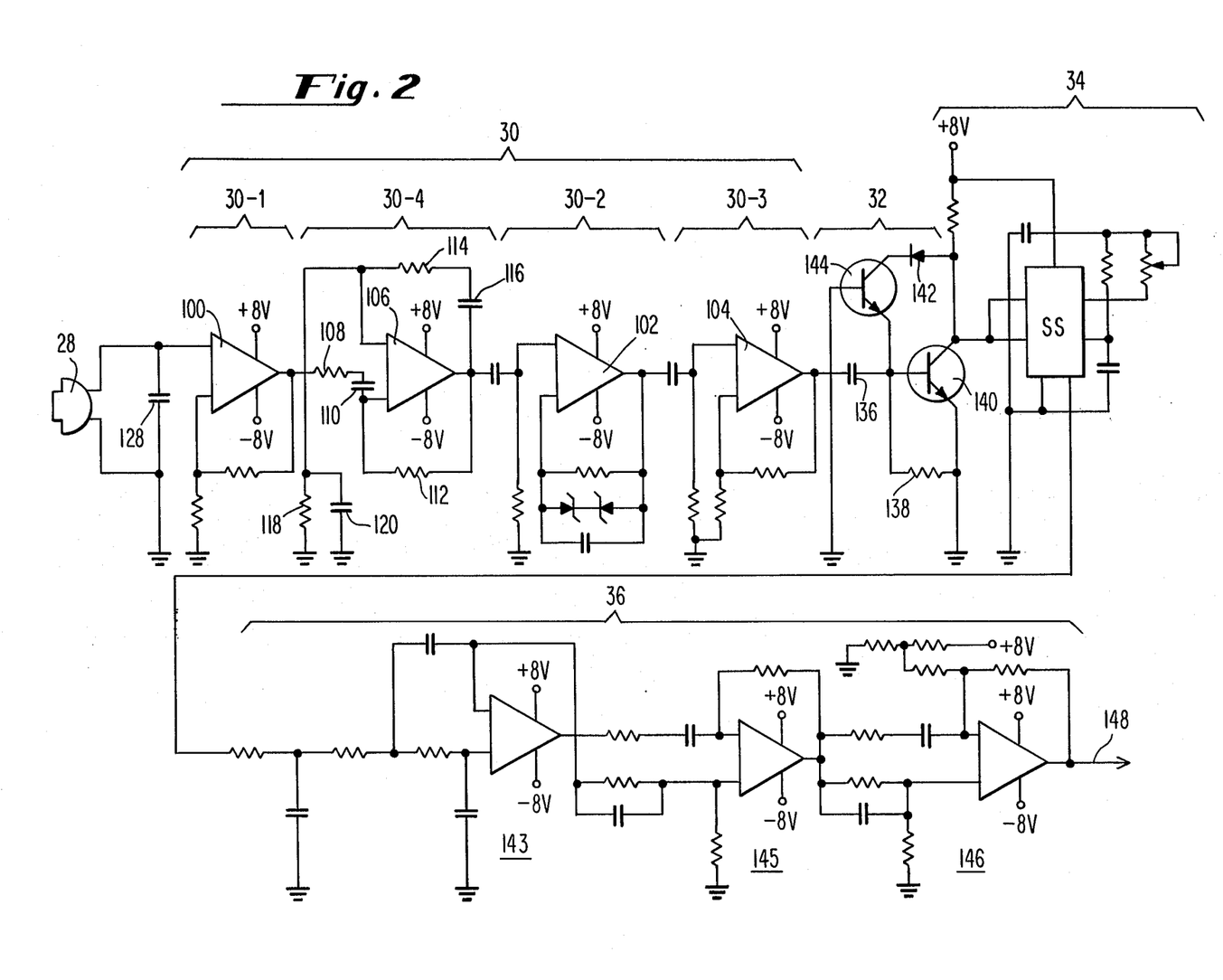
FIG. 2 is a schematic circuit diagram of a portion of the facsimile receiver depicted in FIG. 1.

The operation of the facsimile receiver will now be described in detail beginning with reference to FIG. 2 where it is assumed that the 2400 Hz. signal at the receiver 26 corresponds to black and the 1500 Hz. signal at the receiver 26 corresponds to white. The acoustical coupler 28 shown in FIG. 2 converts the acoustical signals from the handset 26 to electrical signals which are first applied to an input transducer 28, including a capacitor 128 and then to the portion of the receiver comprising the preamplifier and filter 30. The preamplifier and filter 30 comprises a first amplifier stage 30-1, a second amplifier stage 30-2, a third amplifier stage 30-3 and a bandpass filter stage 30-4 between and in series with the first and second amplifier stages 30-1 and 30-2.

The stages 30-1, 30-2 and 30-3 comprise operational amplifier 100, 102 and 104 which are described in the aforesaid copending application. The filter stage 30-4, which is not described or disclosed in the aforesaid copending application comprises an operational amplifier 106, in combination with appropriate RC circuitry so as to achieve bandpass filter characteristics such as that shown in FIG. 6. The inverting terminal of the operational amplifier 106 is connected to the output of the operational amplifier 100 through a resistor 108 and a coupling capacitor 110. A negative feedback path between the output and the inverting terminal is provided by a resistor 112 and a positive feedback path between the output and the noninverting terminal is provided by a resistor 114 and a capacitor 116. The noninverting terminal is then connected to ground through a resistor 118 in parallel with a capacitor 120.

As a result of filter stage 30-4, and stages 30-1, 30-2 and 30-3, the sinusoidal FM signal applied to the amplifier preamplifier and filter stage 30 is amplified and squared while unwanted noise is substantially attenuated. The axis crossing of the amplified and squared FM information-bearing signal is then differentiated by the differentiating circuit 32 comprising a capacitor 136 and a resistor 138 connected between the base and emitter of transistor 140. The collector emitter circuit of a transistor 144 is connected in series with a diode 142 between the collector and the base of the transistor 140. Trigger signals from the differentiating circuit 132 are then applied to the single-shot multivibrator 34 which may comprise a single shot (SS) integrated circuit NE555 manufactured and sold by Signetics Corporation more fully described in copending application Ser. No. 440,392 filed Feb. 7, 1974 now U.S. Pat. No. 3,916,098 which is incorporated herein by reference.

The output of the multivibrator 34 is then applied to the detector 36 which comprises filter circuitry for obtaining the average DC value of the multivibrator output means of an active low pass filter 143 having an 1800 Hz. cut-off rolling off rapidly at 18 db. per octave, an active 3000 Hz. notch filter 145 and an active 4800 Hz. notch filter 146. The output of the notch filter 146 at line 148 may then be connected to the stylus driver 48 as depicted in FIG. 1 as well as scanning control circuit 42 as will now be described with reference to FIG. 3.

Figures 3, 4:
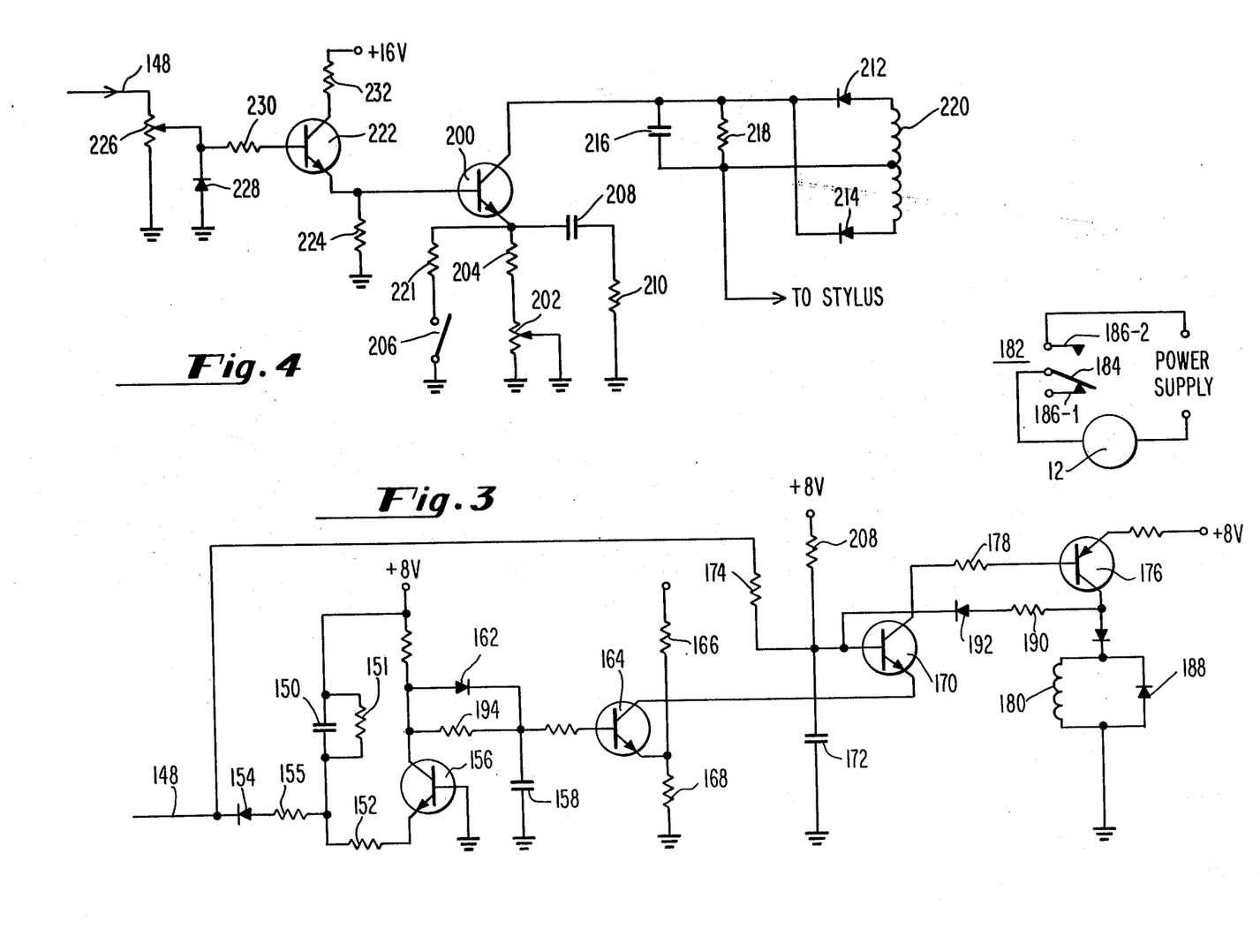
FIG. 3 is a schematic circuit diagram of another portion of the facsimile receiver depicted in FIG. 1.
FIG. 4 is a schematic circuit diagram of yet another portion of the facsimile receiver depicted in FIG. 1.

The control circuit 42 as shown in FIG. 4 initiates scanning of the copy medium in response to the initial 2400 Hz. black signal while substantially immunizing a receiving transceiver from erroneous start-up due to electrical or acoustical noise by being biased into a deenergized state. In this connection, a capacitor 150 in parallel with a resistor 151 is provided which is charged in response to a "whiter than white" frequency modulated signal (less than 1500 Hz.) to a negative value at the terminal 152 through a diode 154 so as to saturate a transistor 156 before the application of a signal having a frequency of 1500 Hz. or more. Saturation of the transistor 156 in turn prevents the charging of the storage capacitor 158. However, when a 1500 to 2400 Hz. signal is applied to the line 148, the capacitor 150 will discharge through the resistors 151 and 152 thereby rendering the transistor 156 non-conductive allowing the capacitor 158 to charge through a diode 162. After approximately 1 second of charging of the capacitor 158, the transistor 164 having an emitter connected to a voltage divider comprising resistor 166 and 168 becomes conductive.

The collector of the transistor 164, which becomes conductive after the application of the 1500 to 2400 Hz. white to black signal, is connected to an ANDing transistor 170 which has a base connected to the line 148 via resistor 174. After period of approximately one second of the 2400 Hz. black signal of the line 148, a capacitor 172 connected to the base of the transistor 170 will charge through a resistor 174 to a sufficient magnitude at the base of the transistor 170 so as to permit the transistor 170 to conduct as long as the transistor 164 conducts thereby enabling the AND circuit comprising the transistor 170. The collector of the transistor 170 is connected to the base of a transistor 176 through a resistor 178 which conducts when the transistor 170 conducts thereby enabling a latch circuit so as to energize a coil 180 associated with a motor switch 182 to place movable contact 184 in engagement with stationary contact 186-2 to apply power from a suitable power supply to the motor 12. A damping diode 188 is connected in parallel with the coil 180.

Noise signals of a frequency substantially less than 1500 Hz. will apply a negative signal to the junction 152 so as to inhibit the AND circuit by biasing the transistor 156 into a conductive state which can only be overcome by the application of a first enabling signal substantially equal to or in excess of 1500 Hz. for a predetermined length of time, e.g., one second. However, even a signal in excess of 1500 Hz. for 1 second is not sufficient to enable the AND circuit. Rather, it also requires a second enabling signal approaching 2000 Hz. for a predetermined length of time, e.g. 1 second, before the AND circuit will be enabled. In general, it is desirable to choose a length of time such as one second which exceeds the duration of most unwanted noise at or about approximately 2000 Hz. thus avoiding false start-up.

Figure 6:
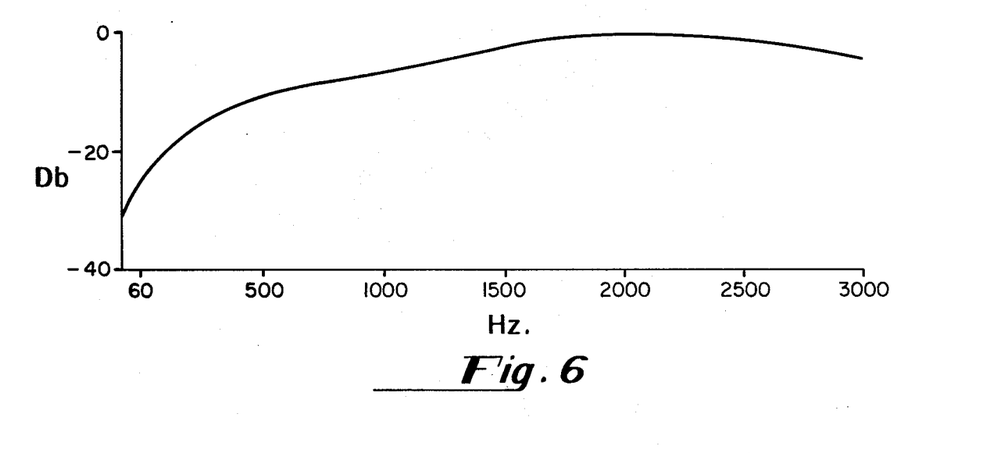
FIG. 6 is a diagram depicting the characteristic of the bandpass filter illustrated in FIG. 2 in accordance with the invention.

It will of course be understood that the bandpass filter 30-4 eliminates many of the whiter-than-white signals, i.e., signals less than 1500 Hz., from reaching the control circuit 42. Nevertheless, there are a sufficient number of signals below 1500 Hz., as shown in FIG. 6 which do reach the control circuit 42 so as to charge the capacitor 150 and thereby saturate the transistor 156, which saturation must be overcome by the application of a first enabling signal substantially equal to or in excess of 1500 Hz. and the application of a second enabling signal approaching 2000 Hz. to the AND circuit.

In order to provide for the continuing operation of the motor 12R after the 2400 Hz. black signal has terminated, a lock-in latch circuit is provided from the collector of the transistor 176 to the base of the transistor 170 including a resistor 190 and a diode 192 forming an OR circuit. This provides for the continuation of the second enabling signal which allows a 1500 Hz. white signal to provide for the continuing operation of the motor 12R.

In order to prevent the temporary loss of signal from interrupting the operation of the motor 12R, a discharge resistor 194 is provided in series with the capacitor 158. The resistance of the resistor 194 is properly chosen so as to provide for a relatively slow discharge of the storage capacitor 158, e.g., 4 seconds, in the event that the transistor 156 becomes conductive in the absence of a 1500 Hz. – 2400 Hz. signal on the lines 148. Thus the stored charge on the capacitor 158 is able to provide for the continuation of the first enabling signal for a short period of time. If the loss of signal should exceed this predetermined length of time, transistor 164 will become non-conductive along with transistors 170 and 176 so as to interrupt the power to the motor 12R.

Figure 5:
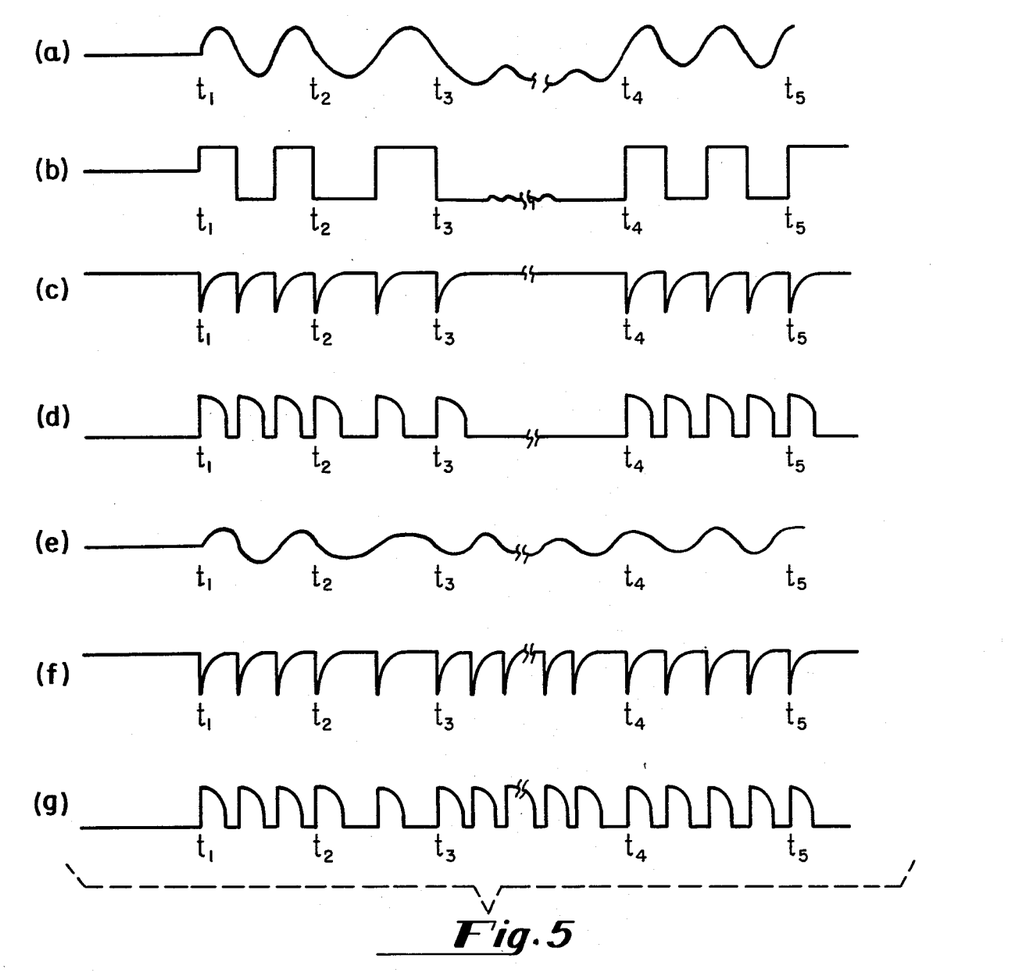
FIG. 5 is a diagram illustrating waveforms generated by a facsimile receiver circuit with and without an important aspect of the invention.

Heretofore, noise on the input signal has given the input signal a characteristic which operated the single-shot multivibrator 34 and the detector 36 in a manner which the control circuit 42 detected as a loss of signal thereby interrupting the operation of the motor 12R. The introduction of the bandpass filter 30-4 has eliminated this faulty or erroneous and clearly unnecessary interruption of the motor 12R by eliminating those noise signals which were erroneously operated upon by the single-shot multivibrator 34 and the detector 36 and erroneously detected by the control circuit 42. Reference will now be made to FIG. 5 and the waveforms shown therein to discuss the nature of the problem prior to the use of the bandpass filter 30-4 and the improvement that the bandpass filter 30-4 has provided.

Waveform $a$ is a substantially sinusoidal signal representing the signal received at the handset 26 including any noise on that signal. From time $t_1$ to $t_2$ and time $t_4$ to $t_5$, the sinusoidal signal has a characteristic frequency of approximately 2400 Hz. corresponding to the reception of a black signal. From time $t_2$ to $t_3$, the signal has a characteristic frequency of approximately 1500 Hz. corresponding to the reception of a white signal. From time $t_3$ to $t_4$, the signal includes a substantial amount of noise, distortion and out-of-band frequency components which are unrelated to the black-white information being received by the receiver.

The first stage 30-1 of the preamplifier and filter 30 produces a sinusoidal signal similar to that depicted in waveform $a$. From time $t_1$ through $t_3$ and $t_4$ and $t_5$, the signal has a frequency corresponding to the frequency of the FM information-bearing signal received at the transceiver. However, from time $t_3$ to $t_4$, the signal is deteriorated by the noise such that a substantial component of the out-of-band frequencies is present in the signal, along with the information-bearing, in-band, signal. The output of the stage 30-3 is a square wave as shown in waveform $b$.

In the absence of the filter 30-4, a signal represented by the waveform $b$ would be applied to the differentiating circuit 32, so as to produce trigger signals at the differentiating circuit 32 as depicted in waveform $c$. In general, the trigger signals of waveform $c$ correspond to the axis crossing of the square wave signal depicted in waveform $b$ and are applied to the single-shot multivibrator 34 so as to create the signal shown in waveform $d$.

In waveform $d$, the duration of the quasistable state of the single-shot multivibrator 34 is shown by pulses. From time $t_1$ to $t_2$ and $t_4$ to $t_5$, the duration of the quasistable state is long relative to the cycle of the multivibrator so as to correspond with black. From time $t_2$ to $t_3$, the duration of the quasistable state is short relative to the multivibrator cycle so as to coresond with white. From time $t_3$ to $t_4$, the noise in the absence of the bandpass filter 30-4 will produce the effect of a range of equivalent input signals ranging from "whiter-than-white" to "blacker-than-black" due to interference between noise or distorted input signals and the information-bearing signal desired from the transmitter. As shown, "whiter-than-white" signals exist from time $t_3$ to $t_4$.

Waveform $e$ depicts the sine wave signal at the output of the preamplifier and filter 30 when the bandpass filter stage 30-4 is present. Note that between the critical times $t_3$ and $t_4$, the sine wave signal now appears as black and white signals, for example, as contrasted with the whiter-than-white signal which would be printed due to noise, etc., in the absence of the filter. As a result, the trigger signals of waveform $f$ produces a single-shot multivibrator output as shown in waveform $g$ which no longer appears as a temporary loss of input signal. As a consequence, the motor 12R will continue to run without the erroneous shutdown encountered in the prior art when an input signal of the type shown in waveform $a$ was received.

In accordance with another important aspect of the invention, the stylus drive circuit shown in FIG. 4 comprises a contrast control circuit as well as a brightness control circuit. More particularly, the stylus drive circuit includes one transistor 200 having a contrast control potentiometer 202 connected in the emitter circuit thereof and another transistor 222 having a brightness control potentiometer 226 connected in the base circuit thereof with one terminal of the potentiometer 226 connected to the line 148 at the output of the detector 36.

Referring first to the user-contrast control circuit, which may be set by the user, the potentiometer 202 is connected in series with a contrast range limiting resistor 204 between the emitter and ground of the transistor 200 to permit adjustment of the collector-emitter current flow through the transistor 200 thereby permitting control of the current to the stylus which is connected in series with the stylus power supply and the collector-emitter circuit of the transistor 200. The stylus power supply includes a pair of diodes 212 and 214 connected to the terminals of a winding 220 and one terminal of a ripple filter and bleeder combination comprising a capacitor 216 and a resistor 218. The other terminal of the combination is connected to the center tap of the winding 220. The emitter circuit of the transistor 200 includes a video peaking circuit consisting of a capacitor 208 and a resistor 210 which is connected to ground. A relatively large resistor 221 is connected between the emitter of the transistor 200 and a scan speed switch 206. This permits a slightly increased stylus current in the higher writing speed of the 4 minute position.

In order to effect an adjustment in the contrast between dark and light regions on the facsimile copy medium, the potentiometer 202 may be adjusted as follows. If it is desirable to increase the contrast, the resistance of the potentiometer 202 is decreased. On the other hand, if it is desirable to reduce the contrast, the resistance of the potentiometer 202 is increased. The resulting increases and decreases in resistance effect a decrease and an increase respectively of the current to the stylus in response to a dark informtion-bearing signal. Preferably, the potentiometer 202 is set so as to write on the copy medium without smudging in response to an FM information-bearing signal of 2350 Hz. where 1500 Hz. corresponds to white and 2400 Hz. corresponds to black.

The brightness control circuit includes a clamping diode 228 which is connected between the tap at the potentiometer 226 and ground so as to clamp any negative going voltages applied to the base of the transistor 222 to ground. A base resistor 230 is provided to connect the tap 226 to the base of the transistor 222 and a collector resistor 232 connects the transistor to the +16 volt power supply. Preferably, the potentiometer 226 is set such that a sufficient base current is provided to the transistor 222 to begin to mark with a light gray on the copy medium with the stylus for an FM information-bearing signal of 1700 Hz. and to provide full black marking capability at a frequency of 2350 Hz.

Although specific settings for the brightness control potentiometer 226 and the contrast control potentiometer 202 have been suggested, it will be appreciated that other settings may be utilized depending upon the use and requirements for the facsimile copy.

In the foregoing, a preferred embodiment of the invention has been shown and described in detail. It will of course be appreciated that various modifications may be made from the preferred embodiment without departing from the true spirit and scope of the invention as set forth in the appended claims.

What is claimed is:

1. A facsimile receiver for producing a copy at a receiving location in response to FM signals transmitted over conventional voice communication lines where said FM signals lie within a predetermined facsimie facsimile and represent light-dark variations in a document at a remote transmitting location one frequency substantially representing white on the document and another frequency substantially representing black on the document said receiver comprising:

trigger means responsive to said FM signals to generate trigger signals having a variable frequency proportional to the frequency of said FM signals;

a single-shot multivibrator coupled to the output of said trigger means for generating a multivibrator output signal having an astable state of fixed duration initiated in response to said trigger signals, the ratio of the astable state duration to the period of the multivibrator cycle being directly proportional to the frequency of said trigger signals;

detecting means coupled to the output of said single-shot multivibrator for detecting the ratio of said astable state duration to the period of the multivibrator cycle in generating a control signal representing said ratio;

a stylus drive circuit coupled to the output of said detecting means and responsive to said control signal said stylus drive circuit comprising a transistor having a base terminal coupled to the output of said detecting means;

a stylus coupled to the output of said stylus drive circuit for marking a copy medium to reproduce light-dark variations in said document;

scanning means for moving said stylus relative to said copy medium; and control means having an input connected to the output of said detecting means and an output connected to the input of said scanning means for deactivating said scanning means when the ratio of said astable state duration to the period of the multivibrator cycle falls below a predetermined level indicating a poor signal quality transmission or loss of signal from the remote transmitting location;

the improvement comprising:

filter means coupled to the input of said trigger means for passing FM signals in the facsimile band while substantially attenuating noise signals outside said band so as to substantially preclude the erroneous interruption of said scanning by said control means in response to noise signals while the receiver is receiving FM signals in the facsimile band while at the same time improving the quality of the facsimile; and contrast control means comprising a potentiometer connected in the collector-emitter circuit of said transistor, said stylus also being connected to said collector-emitter circuit for adjusting the output of said drive circuit so as to control the contrast in the light-dark variations on said copy medium.

2. The facsimile receiver of claim 1 wherein the improvement further comprises brightness control means for adjusting the output of said drive circuit so as to control the light gray print level with respect to a particular frequency within the facsimile band.

3. The facsimile receiver of claim 2 wherein said stylus drive circuit comprises another transistor having a base terminal connected to the output of said detector means and a collector-emitter circuit coupled to the base of said transistor, said brightness control means comprising another potentiometer connected to the base of said other transistor.

4. A facsimile receiver for producing a copy on a copy medium at a receiving location in response to FM signals transmitted over conventional voice communication telephone lines where said FM signals represent light-dark variations in a document at a remote transmitting location with a first frequency representing white on the document and a second frequency representing black on the document, said receiver comprising:

trigger means responsive to said FM signals to generate trigger signals having a variable frequency proportional to the frequency of said FM signals;

a single-shot multivibrator coupled to the output of said trigger means for generating trigger signals having an astable state of fixed duration initiated in response to one of said trigger signals, the ratio of the astable state duration to the period of the multivibrator cycle being directly proportional to the frequency of said FM signals;

detector means coupled to the output of said single-shot multivibrator for detecting the ratio of said astable state duration to the period of the multivibrator cycle and generating a control signal representing said ratio;

a stylus drive circuit coupled to the output of said detector means said stylus drive circuit comprising a first transistor having a base terminal coupled to the output of said detector means;

a stylus coupled to the output of said stylus drive circuit;

contrast control means comprising a potentiometer connected in the collector-emitter circuit of said first transistor, said stylus also being connected to said collector-emitter circuit for adjusting the output of said drive circuit so as to control the contrast in the light-dark variations on said copy medium;

scanning means for moving said stylus relative to said copy medium;

control means coupled to said detector for deactivating said scanning means in response to a poor signal quality transmission or loss of FM signals; and filter means coupled to the input of said trigger means for passing FM signals in a range between said first frequency and second frequency while substantially attenuating noise signals outside said range so as to substantially preclude the generation of trigger signals having a variable frequency proportional to the frequency of the FM signals outside said range and thereby avoid erroneous deactivation while at the same time improving the quality of the facsimile.

5. The facsimile receiver of claim 4 wherein said detector means further comprises a second transistor having a base connected to the collector-emitter circuit of said first transistor and a collector-emitter circuit connected to said stylus, said stylus drive circuit comprising a contrast control potentiometer connected in the collector-emitter circuit of said second transistor.

6. A facsimile receiver for producing a copy on a copy medium at a receiving location in response to signals transmitted at a remote transmitting location wherein said signals represent light-dark variations in a document at the remote transmitting location, said receiver comprising:

means for demodulating said signals representing light-dark variations in the document and generating a control signal in response thereto;

a stylus; and a stylus drive circuit connected to the output of said demodulating means and the input of said stylus for controlling writing by said stylus in response to said control signal, said stylus drive circuit comprising:

one transistor having a base, an emitter and a collector;

another transistor having a base, an emitter and a collector;

means for connecting the base of said one transistor to the output of said demodulating means;

means for connecting the collector-emitter circuit of said one transistor to the base of said other transistor;

brightness control means comprising a potentiometer connected in the base circuit of said one transistor for adjusting and thereby controlling the darkness of writing by said stylus in response to a particular input signal received by said receiver; and     contrast control means comprising a potentiometer connected in the collector-emitter circuit of said other transistor for controlling contrast in writing by said stylus in response to different signals received by said receiver.

* * * * *